3,558,434
STIMULATION OF THE GROWTH OF
MICROORGANISMS
Robert J. Herschler, Camas, Wash., assignor to Crown
Zellerbach Corporation, San Francisco, Calif., a corporation of Nevada
No Drawing. Application Apr. 13, 1966, Ser. No. 542,189,
now Patent No. 3,361,555, which is a continuation-in-part of applications Ser. No. 346,366, Feb. 10, 1964,
and Ser. No. 344,558, Feb. 13, 1964. Divided and this
application Mar. 10, 1967, Ser. No. 622,088
Int. Cl. C12b 1/20, 3/14; C12d 13/01
U.S. Cl. 195—81                                 15 Claims

ABSTRACT OF THE DISCLOSURE

Process for stimulating the growth of microorganisms by employing an effective amount of dimethyl sulfoxide in the growth medium.

CROSS-REFERENCE TO RELATED APPLICATIONS

This application is a division of copending application, Ser. No. 542,189, filed Apr. 13, 1966 now U.S. Pat. 3,361,555, Jan. 2, 1968. The latter application is a continuation-in-part of applications, Ser. No. 346,366, filed Feb. 10, 1964, now abandoned, and Ser. No. 344,558, filed Feb. 13, 1964, now abandoned.

SUMMARY OF THE INVENTION

This invention relates generally to a method for stimulating the growth of microorganisms by contacting them with an effective amount of dimethyl sulfoxide.

It is an object of the invention to stimulate the growth of microorganisms by an agent which may be easily and safely employed.

Another object is to increase the production of the metabolites of microorganisms by contacting them with an effective amount of dimethyl sulfoxide.

DETAILED DESCRIPTION

It has been found that stimulation of vegetative growth of microorganisms may be effected by contacting them with an effective amount of dimethyl sulfoxide. The microorganisms intended to be included are those microorganisms generally considered by the microbiologist to be microscopic plants, and especially various bacteria, fungi and yeasts.

Dimethyl sulfoxide has low mammalian toxicity which permits it to be handled safely, and is supplied by the Crown Zellerbach Corporation, San Francisco, Calif. It is a water-clear liquid melting at about 18.5° C. and boiling at about 189° C. Dimethylsulfoxide may be prepared by various methods such as described in U.S. Pats. Nos. 2,581,050, 2,935,533 and 2,702,824.

It has been found that vegetative growth of microorganisms is enhanced with effectively small amounts of dimethyl sulfoxide, and that spore formation is depressed while the vegetative cell growth and production are stimulated. Stimulation of vegetative growth is shown with fungi such as *Aspergillus niger*, *Penicillium notatum*, *Penicillium digitatum*, and the like; with true yeasts of the family Endomyceteae such as Brewer's yeast or *Saccharomyces cerevisiae*; and with bacteria such as *B. amylobacter* which is used in the acetone-bacterial fermentation process.

Induction of spore formation theoretically could be due to a tie-up of calcium and/or other essential nutrients. Dimethyl sulfoxide may interfere with the metabolic process or changes therein which induces spore formation. It is to be emphasized, however, that the particular mechanism involved is not critical to an understanding of the results described herein, and the foregoing hypothesis are not to be construed as limiting or binding.

This property of increasing vegetative growth may be useful in the treatment of sewage wherein increased vegetative growth of the microorganisms responsible for decomposition would be useful. Also, increasing the yield and/or decreasing the production time of certain products of vegetative growth of microorganisms (metabolites) may be highly desirable; exemplary of such products are antibiotics, alcohols such as ethanol, butanol, and glycerol, acetone, polysaccharides such as dextrans, ergot alkaloids, acetaldehyde, various organic acids such as acetic, citric, lactic, propionic, gluconic, fumaric, itaconic and kojic, vitamins, amino acids, gibberellins, enzymes and protein synthesis.

Illustrative of microorganisms employed in obtaining the foregoing exemplary products are: the various species of Streptomyces, Penicillium and Cephalosporium fungi used in manufacturing antibiotics; various species of Saccharomyces yeast used in manufacturing alcohols; the Clostridium bacterium used in manufacturing acetone and butanol; the various strains of Acetobacter, Betabacterium, Leuconostoc, Streptobacterium and Streptococcus employed in the manufacture of dextrans; species of the ergot fungus Claviceps employed in manufacturing ergot alkaloids; various species of Acetobacter and Acetomonas employed in manufacturing acetic acid; *Aspergillus niger* used in manufacturing citric and gluconic acids; the species of Lactobacillus employed in manufacturing lactic acid; the Propionibacterium employed in manufacturing propionic acid; species of Rhizopus employed in the manufacture of fumaric acid; *Asperigillus terreus* used in manufacturing itaconic acid; various species of Aspergillus used in manufacturing kojic acid; the yeast *Ashbya gossypii* employed in manufacturing the vitamin riboflavin; the actinomycetes *Streptomyces olivaceus* or the bacterium *Bacillus megaterium* used in manufacturing Vitamin $B_{12}$; members of the phycomycetes genera Choanephora or Blakeslea useful in manufacturing Vitamin A; the bacteria *Aerobacter aerogenes* or *Escherichia coli* employed in manufacturing the amino acid lysine; the strains of *Gibberella fujikuroi* used in manufacturing gibberellins; the various species of Aspergillus, Bacillus, Saccharomyces, Streptomyces, Penicillium, Rhizobium and Clostridium useful in manufacturing various hydrolytic and non-hydrolytic enzymes; and various yeasts such as *S. cerevisiae* and *Candida utilis* useful in furnishing protein.

In the culturing of all the aforementioned microscopic plants, conventional incubation temperatures and growth mediums are employed, which are well known in the art, with the exception that dimethyl sulfoxide is added to the medium in an amount sufficient to stimulate vegetative growth, but not in amounts so great as to inhibit or stop the growth of the microorganisms.

The amount of dimethyl sulfoxide which stimulates vegetative growth is generally small, and is generally at least about from 20 p.p.m. to 500 p.p.m. of the growth medium. The property of stimulated vegetative growth is demonstrated with amounts of dimethyl sulfoxide of up to about 3% by weight. Above about 3% by weight of dimethyl sulfoxide in an environment containing microorganisms, a biocidal or biostatic effect is obtained. Dimethyl sulfoxide stimulates the vegetative growth process of microscopic plants cultured under both aerobic and anaerobic conditions, although it appears to give superior results in aerobic cultures.

In the production of antibiotics, the processes generally involve cultivating the antibiotic-producing microorganism in a suitable nutrient medium under aerobic conditions with agitation, preferably at a temperature of about 22° C. to 32° C. The standard culture media contain a source of carbohydrate, such as sugars, starch, and glycerol; a source of organic nitrogen, such as bean meals and particularly soybean meal, wheat gluten, cotton seed meal, lactalbumin, and enzymatic digests of proteins; and a growth-promoting substance, such as distillers solubles and yeast extracts. Mineral salts, such as sodium chloride, sodium nitrate, and potassium phosphate, a buffering agent such as calcium carbonate and a vegetable or mineral oil are also usually incorporated therein. In accordance with the present invention dimethyl sulfoxide is also added to the growth media in an amount which stimulates antibiotic production. After growth for a suitable period of time at which an appreciable antibiotic potency has been imparted to the medium, generally a period of about one to five days, the mycelium which is formed is separated from the broth containing the elaborated antibiotic, and the latter is then recovered by conventional procedures.

The following table sets forth generally suitable conventional procedures for the production of various products of microbial growth. Again, in accordance with the present invention, a growth-stimulating amount of dimethyl sulfoxide is added to the growth media. These conditions are to be considered illustrative only, and not limiting:

EXAMPLE 1

Stimulation of fungi with different concentrations of dimethyl sulfoxide

Two batches of fortified corn steep broth were prepared according to the following formulation:

| Ingredient: | Parts by weight |
|---|---|
| Lactic acid | 2.3 |
| Total nitrogen | 0.7 |
| Amino nitrogen | 0.3 |
| Reducing sugars | 0.7 |
| Inert solids | 2.1 |
| Potassium dihydrogen phosphate | 0.1 |
| Magnesium sulfate | 0.005 |
| Water—sufficient to make 100 parts. | |

Strains of *Penicillium notatum* were cultured in one batch and strains of *Aspergillus niger* were cultured in the second batch. These fungi fall within the filamentous ascomycetes class. To each culture in each group was added dimethyl sulfoxide in sequential amounts which increased incrementally. The first addition was 500 p.p.m. and then 10,000 p.p.m. which was equivalent to 1% by weight of the culture. Thereafter, the amount was increased by 1% through a series starting at 1%

TABLE I.—GROWTH CONDITIONS FOR VARIOUS MICROORGANISMS

| Product | Microorganisms | Substrate | Type of culture | pH | Temperature, °C. | Time, days |
|---|---|---|---|---|---|---|
| Acetone-butanol | Clostridium acetobutylicum | Molasses diluted to 5-7% sugar, with addition of ammonium compounds and CaHPO₄ as required. | Anaerobic | 5.0-7.0 | 29-34 | 1.7-2 |
| Dextran | Leuconostoc mesenteroides | Sucrose plus nutrients | do | 4.5-7.0 | 20-30 | 1-5 |
| Ergot alkaloids | Claviceps purpurea | Yeast extracts, mannitol | Aerobic | 4-7 | 20-32 | 43 |
| Bacterial amylase | Bacillus subtilus | Vegetable protein plus sugar for surface; starch cereal grain, and protein for subsurface. | Surface, aerobic, or subsurface, aerobic. | 6.5-7.0 | 30-40 | 1-3 |
| Bacterial protease | B. subtilus | 1% protein, 6% carbohydrate, salts | Surface aerobic | 6.5-7.0 | 37 | 3-5 |
| 5-keto-gluconic acid | Acetobacter suboxydans | Glucose | Aerobic | 4.5-7.0 | 30-35 | 1.5-2.5 |
| Fumaric acid | Rhizopus nigricans | 5-10% invert sugar, plus nutrient salts and CaCO₃. | Subsurface aerobic. | 5-6 | 33 | 4 |
| Itaconic acid | Aspergillus terreus | 6.6-27.5% glucose or sucrose (molasses) plus (NH₄)₂SO₄, MgSO₄, corn steep liquor. | Subsurface, or surface aerobic. | 1.8-2.2 | 35 | 2-3 |
| Riboflavin | Ashbya gossypii | Glucose and purified sucrose or maltose and corn steep liquor. | Submerged, aerobic. | 6-7 | 26-28 | 4-5 |
| Lysine | Escherichia coli | Glycerol, corn steep liquor and salts, 0.5% CaCO₃. | Aerobic | 7-7.5 | 28 | 3 |
| Gibberellin | Gibberella fujikuroi | Glucose tartrate salts | Submerged, aerobic. | 5-6 | 25-35 | 8 |
| 11-v-Hydroxyprogesterone | R. arrhizus, R. nigricans, etc. | Progesterone, plus lactalbumin digest, corn steep liquor, glucose. | Aerobic | 4.4-6 | 24-28 | 2-3 |

Much of the data in Table I was obtained from the standard reference work, "Handbook of Biological Data," W. S. Spector (ed.), W. B. Saunders Co., Philadelphia, 1956, to which reference is made for more specific data, and for growth data relative to those microorganisms which have not been specifically set forth herein. It is to be understood, however, that the present invention is concerned with stimulating the vegetative growth of microscopic plants in general by employing an effective amount of dimethyl sulfoxide, and the microorganisms and their growth conditions specifically set forth are intended to be illustrative only and not limiting as it is apparent that the presence of dimethyl sulfoxide may stimulate the vegetative growth of many microorganisms not specifically mentioned.

It is to be emphasized that sporulation may not be completely terminated. However, much useless sporulation, which occurs at the expense of vegetative growth, is inhibited.

The following examples are presented to illustrate various embodiments of the invention with respect to treatment of microscopic plants, but it should be understood that they are not meant to represent an exclusive teaching.

and ending at 10%. The culture condtions otherwise remained standard.

Concentrations of the microorganisms in the broth were determined after each addition. It was shown that concentrations of dimethyl sulfoxide up to about 3% measurably enhanced vegetative growth with a maximum yield of 16% compared to a control yield of about 1.5% based on total medium weight. Sporulation at the same time was depressed with incremental increases of dimethyl sulfoxide concentrations. Above 5% dimethyl sulfoxide concentration levels the growth was depressed, being at the lowest level in the highest dimethyl sulfoxide culture concentration of 10%. Enhanced vegetative growth may therefore be obtained with lower dimethyl sulfoxide concentrations in the culture. Higher concentrations tend to inhibit growth of both vegetative and spore forms of fungi in the culture.

EXAMPLE 2

Treatment of municipal sewage

The increased vegetative growth of the microorganisms responsible for the oxidation of the organic matter in sewage by the addition of dimethyl sulfoxide to the growth environment may be demonstrated as follows:

Two samples of fresh municipal sewage are obtained and activated sludge added to each. Immediately thereafter 0.25% by weight of dimethyl sulfoxide is added to one of the samples. Both samples are vigorously agitated aerobically for a period of 4 hours. The particules of floc obtained are gelatinous in nature and contain a large number of bacteria, many of which form slime. Other microorganisms, such as yeasts, molds, and protozoa, may also be enmeshed in the floccule, which includes numerous inert particles of the sewage as well. Agitation of the samples furnishes copious supply of oxygen providing ideal conditions for oxidation. The overall process is conducive to very vigorous growth of microorganisms which readily metabolize the organic matter entrapped in the floccules. The addition of dimethyl sulfoxide to the sewage increases the rate of vegetative growth of various of the microorganisms responsible for this oxidation, thereby increasing the oxidation rate. The biological oxygen demand (BOD) of the fresh sewage before treatment is about 20 to 50 p.p.m. The BOD of the standard treated sewage sample after treatment is about 2.5 to 5.0 p.p.m., whereas the BOD of the DMSO treated sample is about 1.6 to 2.5 p.p.m.

EXAMPLE 3

Treatment of industrial sewage

This example illustrates how the waste liquor from pulping operations may be treated with enhanced results. Samples of sulfite waste liquor of 15% solids are obtained and the biological oxygen demand (BOD) determined to be 30,000 parts per million (p.p.m.). Two samples of this waste liquor are placed into containers and inoculated with a mixed adapted culture of microorganisms known to operate upon the organic matter of the waste liquor. One of these two samples is also injected with 0.75% by weight dimethyl sulfoxide, the other sample serving as a control. Fermentation is carried out aerobically for a period of 8 hours. At the end of this period, the BOD of each sample is determined by standard procedures. The BOD of the control sample is about 9,000 p.p.m., whereas the BOD for the sample treated with the dimethyl sulfoxide is less, being about 7,500 p.p.m. This illustrates that the presence of dimethyl sulfoxide increases the vegetative growth of the aerobic bacteria which oxidize the organic matter in the waste liquor, thereby resulting in a more complete removal of those materials which are oxidizable. The polysaccharides and simple sugars contained in the sulfite waste liquor are more efficiently broken down into carbon dioxide and water where dimethyl sulfoxide is added to the waste liquor.

EXAMPLE 4

Production of streptomycin

This example illustrates how the production of streptomycin may be enhanced by the presence of dimethyl sulfoxide in the growth medium. A growth medium containing the following materials is prepared:

| Ingredient: | Grams per liter |
|---|---|
| Glucose | 25 |
| Extracted soy bean meal | 40 |
| Distillers dried solubles | 5 |
| Sodium chloride | 2.5 |
| Dimethyl sulfoxide—5,000 p.p.m. | |

The foregoing medium is inoculated with a phage-resistant strain of *Streptomyces griseus* and incubated at a temperature in the range of 24° C. to 30° C. and a pH of 7.6 to 8 for 5 days. A control sample is also inoculated and incubated which contains all the ingredients of the foregoing medium except that it contains no dimethyl sulfoxide. At the end of 5 days both the control and the dimethyl sulfoxide-containing culture is harvested for the antibiotic. The culture containing dimethyl sulfoxide produces about 15% more antibiotic units than the control. This is believed due to the enhancement of the vegetative growth of *S. griseus*.

EXAMPLE 5

Production of citric acid

The increase in production of citric acid in a medium containing dimethyl sulfoxide may be shown as follows: Culture vessels containing a 20% sucrose solution and suitable nutrients are inoculated with *Aspergillus niger*. Some of the culture vessels also contain 5,000 p.p.m. dimethyl sulfoxide in the growth medium while others (controls) do not. The inoculated vessels are aerobically fermented at 25°–30° C. for a period of 10 days. The liquor is drawn off, the mycelium washed and pressed to remove any citric acid present within the cells, and the liquor transferred to another vessel where the citric acid is recovered by precipitation as the calcium salt. The citric acid yield of the controls is about 50% by weight while that of the dimethyl sulfoxide-treated culture is about 65% by weight based on the sucrose.

In the foregoing specification the various specific examples of materials, procedures and uses are intended to be illustrative only and not limiting as there are many variations which will occur to those having ordinary skill in the art and which are intended to be included within the scope of the following claims.

I claim:

1. A method of stimulating the vegetative growth of microorganisms selected from the group consisting of bacteria, fungi and yeasts comprising culturing the microorganism in a growth medium containing an amount of dimethyl sulfoxide effective to stimulate the vegetative growth thereof but insufficient to cause undue toxicity.

2. The method of claim 1 wherein said amount of dimethyl sulfoxide employed is from about 20 parts per million up to about 3% by weight of the medium in which said microorganisms are located.

3. The method of claim 1 wherein said microorganisms are located in an aqueous biodegradable medium comprising sewage.

4. The method of claim 1 wherein said microorganisms produce a product selected from the group consisting of antibiotics, alcohols, acetone, polysaccharides, alkaloids, organic acids, amino acids, gibberellins, enzymes and proteins.

5. The method of claim 1 wherein said microorganisms selected from the group consisting of: species of Streptomyces, Penicillium, Cephalosporium, Clostridium, Acetobacter, Betabacterium, Leuconostoc, Claviceps, Acetomonas, Aspergillus, Lactobacillus, Propionibacterium, Rhizopus, Chanephora, Bacillus, yeasts of the family Endomyceteae, *Ashbya gossypii*, *Escherichia coli*; and *Giberella fujikuroi*.

6. The method of claim 1 wherein the microorganism is a fungus.

7. The method of claim 6 wherein the fungus is a species selected from the group consisting of Penicillium, Aspergillus and Streptomyces.

8. The method of claim 7 wherein the fungus is *Penicillium notatum*.

9. The method of claim 7 wherein the fungus is *Aspergillus niger*.

10. The method of claim 7 wherein the fungus is *Streptomyces griseus*.

11. A growth medium for a microorganism comprising all of the essential nutrients required for the culturing of the microorganism and an amount of dimethyl sulfoxide effective to stimulate the vegetative growth of said microorganism.

12. The medium of claim 10 wherein the amount of dimethyl sulfoxide is from about 20 parts per million up to about 3% by weight of the medium.

13. A growth medium for microorganisms comprising assimilable sources of carbon, nitrogen, essential trace minerals, and dimethyl sulfoxide in an amount of from about 20 parts per million up to about 3% by weight of the medium.

14. In the method of oxidizing organic matter in sewage by the biological action of microorganisms, the improvement comprising incorporating into the sewage an amount of dimethyl sulfoxide effective to stimulate the vegetative growth of the microorganisms in said sewage, where said microorganisms are selected from the group consisting of bacteria, fungi, yeasts and mixtures thereof.

15. The method of claim 14 wherein said amount of dimethyl sulfoxide is from about 20 parts per million up to about 3% by weight of said sewage.

References Cited

UNITED STATES PATENTS

| | | | |
|---|---|---|---|
| 2,302,079 | 11/1942 | Waldmann | 195—66 |
| 2,544,273 | 3/1951 | Miner et al. | 195—82 |
| 3,183,171 | 5/1965 | Schreiner | 195—82 |

OTHER REFERENCES

Bridges: Int. J. Rad. Biol., vol. 5, No. 1, pp. 101–104 (1962).

Bridges: Radiation Research, vol. 17, pp. 801–808 (1962).

Bridges: J. Gen. Microbiol., vol. 31, pp. 405–412 (1963).

Foley et al.: Ann. N.Y. Acad. Sci., vol 76, pp. 413–441 (1958).

ALVIN E. TANENHOLTZ, Primary Examiner

U.S. Cl. X.R.

195—28, 31, 36, 44, 47, 51, 66, 82, 96, 80, 100, 114; 424—337; 210—15